United States Patent
Zhao et al.

(10) Patent No.: US 10,324,656 B1
(45) Date of Patent: Jun. 18, 2019

(54) APPLICATION-AWARE CONTROL FOR DATA SERVICES

(71) Applicants: EMC Corporation, Hopkinton, MA (US); EMC IP Holding Company LLC, Hopkinton, MA (US)

(72) Inventors: Junping Zhao, Beijing (CN); Accela Zhao, Shanghai (CN); Ricky Sun, Beijing (CN); Kenneth Durazzo, San Ramon, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/223,112

(22) Filed: Jul. 29, 2016

(51) Int. Cl.
G03F 3/06 (2006.01)
G06F 3/06 (2006.01)

(52) U.S. Cl.
CPC .......... *G06F 3/0659* (2013.01); *G06F 3/0605* (2013.01); *G06F 3/067* (2013.01); *G06F 3/0616* (2013.01); *G06F 3/0644* (2013.01)

(58) Field of Classification Search
None
See application file for complete search history.

(56) References Cited

U.S. PATENT DOCUMENTS

| | | | | | |
|---|---|---|---|---|---|
| 7,133,995 B1* | 11/2006 | Isaac | ................... | G06F 12/0215 | 711/167 |
| 7,370,153 B1* | 5/2008 | Danilak | ................ | G06F 13/385 | 711/111 |
| 8,595,437 B1* | 11/2013 | Glasco | ................ | G06F 12/0804 | 711/118 |
| 2004/0162932 A1* | 8/2004 | Mizushima | ......... | G06F 12/1458 | 711/103 |
| 2006/0117190 A1* | 6/2006 | Morita | ................. | G06Q 20/341 | 713/193 |
| 2011/0202717 A1* | 8/2011 | Kezuka | .................... | G06F 3/061 | 711/113 |
| 2013/0024432 A1* | 1/2013 | Pendharkar | ....... | G06F 17/30147 | 707/693 |
| 2013/0268741 A1* | 10/2013 | Daly | ..................... | G06F 12/023 | 711/165 |
| 2014/0281262 A1* | 9/2014 | Callaway | ............ | G06F 12/0891 | 711/135 |
| 2015/0378822 A1* | 12/2015 | Grube | ................. | G06F 11/1092 | 714/763 |
| 2017/0153838 A1* | 6/2017 | Matsubara | ............ | G06F 3/0638 | |

* cited by examiner

*Primary Examiner* — Sean D Rossiter
*Assistant Examiner* — Charles J Choi
(74) *Attorney, Agent, or Firm* — Ryan, Mason & Lewis, LLP

(57) ABSTRACT

A method of controlling one or more data services in a computing environment includes the following steps. A request to one of read data from and write data to one or more storage devices in a computing environment is obtained from an application executing on a host device in the computing environment. One or more application-aware parameters associated with the data of the request are obtained. Operation of the one or more data services is controlled based on the one or more application-aware parameters.

20 Claims, 7 Drawing Sheets

EXPLICIT HINT BY FS/BLOCK/APP

```
DPT              DPT                 DPT            ⎫
(OPEN API)   (IOCTL/FADVICE API)  (MMAP/MADVICE API) ⎬ 310
                                                     ⎭
```

- DPT FLAG PARSE — 312
- SAVE INTO EXEMPTION TABLE — 314
- DECISION MAKING — 316

| TYPE | KEY | VALUE (FLAGS) | TEMPORARY |
|---|---|---|---|
| WHOLE_DEV | UNIQUE OF TARGET ID (i.e., BLOCK DEV ID, FILE Inode etc.) | O_METADATA \| O_UNIQUE_KEY | N |
| RANGE_AREA | [ID, startAddr, LENGTH] | O_COMPRESSED | N |
| RANGE_AREA | [ID, startAddr, LENGTH] | O_DYNAMIC_HOT_RANGE | Y |
| ... | | | |

| | | COMPRESSION | DEDUPLICATION |
|---|---|---|---|
| WRITE | FULL WRITE | 1 | 1 |
| | PARTIAL WRITE | 3 | 2 |
| READ | FULL READ | 1 | 1 |
| | PARTIAL READ | 2 | 2 |

APPLICATION-AWARE CONTROL FOR DATA SERVICES

FIELD

The field relates generally to computing environments, and more particularly to control of data services in such computing environments.

BACKGROUND

Computing environments, such as data centers, frequently employ cloud computing platforms, where "cloud" refers to a collective computing infrastructure that implements a cloud computing paradigm. For example, as per the National Institute of Standards and Technology, cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. Cloud-based data centers are deployed and managed by cloud service providers, who provide a computing environment for customers (tenants) to run their application programs (e.g. business applications or otherwise). The applications are typically run on one or more computing devices (i.e., host devices or hosts), and write data to and read data from one or more storage devices (e.g., hard disk drives, flash drives, etc.). The storage devices may be remote from the host devices such that they are connected via a communication network. However, some or all of the storage devices may be part of the same computing devices that implement the hosts.

Scheduling of the read and write requests, or input/output (TO) requests as they are also called, from the applications to the storage devices is managed by a software component known as an IO scheduler (also called a system IO scheduler). However, prior to an IO request with its dataset being submitted by the IO scheduler to the storage devices, it has become typical to apply one or more data services to the dataset that perform some form of data reduction on the dataset. For example, data reduction type data services may include, but are not limited to, data deduplication and data compression.

SUMMARY

Embodiments of the invention provide techniques for improved control of data services in computing environments.

For example, in one embodiment, a method of controlling one or more data services in a computing environment comprises the following steps. A request to one of read data from and write data to one or more storage devices in a computing environment is obtained from an application executing on a host device in the computing environment. One or more application-aware parameters associated with the data of the request are obtained. Operation of the one or more data services is controlled based on the one or more application-aware parameters.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "computing environment," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

It is realized herein that the use of data reduction type data services (or data reduction service), such as, for example, data deduplication and data compression, in conjunction with computing environments, such as, for example, the application host computing environment mentioned above, has become prevalent.

Data deduplication (or dedup as it is known in short) is a data service that segments an incoming data stream, uniquely identifies data segments, and then compares the segments to previously stored data. If the segment is unique, it is stored on disk. However, if an incoming data segment is a duplicate of what has already been stored, a reference is created to it and the segment is not stored again. For example, a file or volume that is backed up every week creates a significant amount of duplicate data. A data deduplication service analyzes the data and stores only the unique segments of a file. This process can provide an average of 10 to 30 times reduction in storage capacity requirements, with average backup retention policies on normal enterprise data. This means that companies can store 10 TB to 30 TB of backup data on 1 TB of physical disk capacity, which has huge economic benefits.

In conjunction with the data deduplication service, data compression is a data service that is used to compress the unique segments of a file before they are stored on disk. Data compression in a block-based storage system reduces the size of data on disk, typically increasing available capacity up to about 50 percent. Compression can typically be enabled automatically and operates in the background to avoid performance degradation.

More particularly, inline deduplication and/or compression are prevalent today especially for flash device or networking IO. An inline data service is a data service that is performed on data before or as it is being written to a storage device. Inline is also illustratively used to refer to a data reduction type data service that is done before acknowledgement to the application.

Data reduction type data services, such as inline deduplication and/or compression, are widely used in systems that include flash storage, networking IO, etc., in order to reduce IO datasets and/or improve flash lifetime. Such data services are also used in a large target system, such as a file system (FS), a storage volume (Vol), a pool/disk group or globally. Once enabled, such data services are typically always on (unless manually turned off) and take effect on all datasets of the target system. However, it is realized herein that such data services suffer unnecessary performance penalty (as profiled, latency could be 3 times or more worse, and input/output operations per second (IOPS) could drop 30+%), or are not optimal for a few common cases in practice. Examples of these practices include, but are not limited to:

1. Data of the IO dataset is unique enough or already compressed. This is the case with metadata such as, for example, inode, or with UUID/timestamp/random data embedded, encrypted data, etc. Then, execution of deduplication or compression gains nothing but overhead, especially with its potential significant impact on latency and IOPS.

2. Data has special meaning for an application and is not suitable for reduction, e.g.: performance, consistency, fault-tolerance etc., the benefit from deduplication/compression is trivial, the benefit does not outweigh the adverse side effects of performing the data service. For instance, journaling requires fast sequential IO (rather than pieces of random TO), or an application may have several replicas for redundancy that should not be deduplicated.

3. Data access could conflict significantly with data reduction features such as, for example, a frequent partial read or a re-write which leads to a costly read→decompress→modify→compress operation sequence.

The above cases could be categorized as anti-reduction in that they are not friendly, not suitable, and/or not possible for performance of deduplication or compression. To summarize, the problems or challenges of current deduplication/compression control include, but are not limited to:

1. As there is a lack of control in existing approaches between an application and data reduction services, some inherent properties/products of applications such as, e.g., metadata, unique data, compressed data, replicas, journaling, etc., are ignored by underlying deduplication/compression services and, as a result, the computing environment suffers unnecessary performance penalties or negative impacts with respect to application expectations.

2. Workload dynamic properties or patterns may change over time and conflict with data reduction services, such as frequently accessed (hot) data, frequent partial access, etc. In practice, such data services would suffer more penalties and call for better handling.

3. Any adjustments or features that can be turned on/off for specific datasets, should not compromise data integrity and normal application access.

Illustrative embodiments provide techniques which overcome the above and other drawbacks through an application-aware data services framework that:

1. Enables application-explicit hints on specific datasets (either for data on the entire device or data of a specific range such as metadata, replicas, unique or random data, compressed data, etc.) to (permanently) bypass data reduction type data services in order to attain higher performance (especially latency).

2. Determines and monitors dynamic weight access patterns based on their negative performance impact, and temporarily bypasses features or takes proactive load or cache actions for specific conflicted datasets in order to reduce performance penalties.

3. Is transparent to applications, and causes no compromise on data correctness and consistency.

The application-aware data services framework can apply to various computing environments including, but not limited to, hyperconverged systems such as ScaleIO/VxRack, cloud based systems such as CloudArray/CloudBoost, or server side software such as DevMapper or FileSystem (FS).

As will be explained in detail herein, in one embodiment, the framework comprises a set of modules configured between the application and the deduplication/compression services. In another embodiment, the framework is integrated as one or more add-ons with existing deduplication/compression services. More specifically, in the modules/add-ons in the framework, the following illustrative functionalities are enabled:

1. Data Property Tags (DPT) and application programming interface (API) for application-explicit hints.

2) Data access Pattern Dynamic Weighting (DPDW) for conflicted access tracking and sorting, and background proactive actions.

3) Relevant metadata to reflect adjustment, such as SortTable and ExemptionTable.

4) Relevant configuration, management and monitoring modules.

Illustrative embodiments realize that it is beneficial to enable fine-grained control over data reduction type data services, so that such services are available on the target (file/vol/pool, etc.) but, for specific ranges, they could be exempted (either permanently or temporarily). Illustrative embodiments further provide application-aware and fine-grained control that enable an application to explicitly specify a dataset or range, or the framework can dynamically identify any conflicted access pattern on specific ranges, that instruct the data reduction services to bypass execution or take proactive actions (such as preload compressed data, read-cache, etc.) for better end-end performance.

Figure 1:
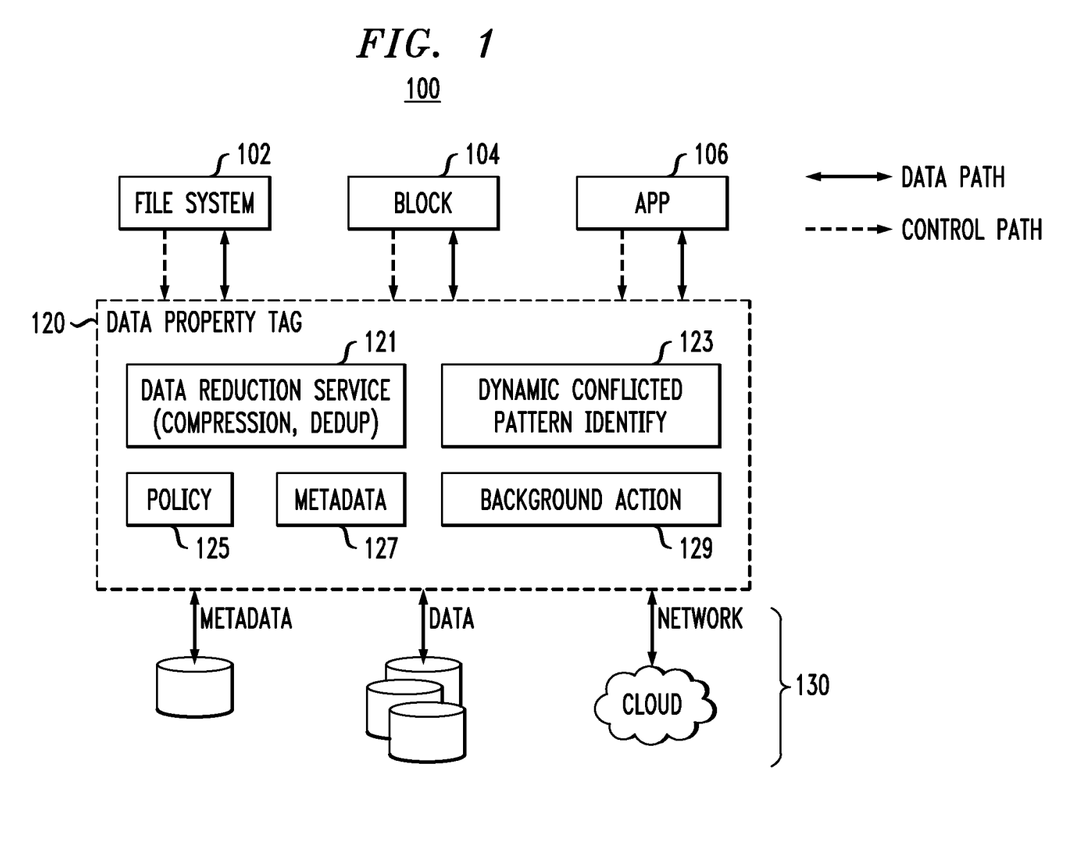
FIG. 1 illustrates a computing environment with an application-aware and fine-grained control of data reduction type data service, according to an embodiment of the invention.

FIG. 1 illustrates a computing environment 100 with an application-aware and fine-grained control of data reduction type data service, according to an embodiment of the invention. More specifically, as shown, computing environment 100 comprises a plurality of host device modules including file system module 102, block data module 104, and application (App) module 106. Note that these elements are operatively coupled to a data property tag module 120 which comprises one or more data reduction service modules 121

(e.g., deduplication/compression), dynamic conflicted pattern identity module 123, a policy module 125, metadata 127, and a background action module 129. Data paths between the elements are represented as solid lines, while control paths are represented as dashed lines. The application module, block data module, and/or file system module generate a plurality of IO requests that are provided to module 120 for processing before being sent on to one or more storage devices collectively referenced as 130. For example, as shown, the IO requests may be directed to storage devices that store metadata and/or data, and may be directed to one or more storage devices located in a cloud platform operatively coupled to the module 120 by a communication network. Not expressly shown, but understood to be part of the computing environment 100, is an IO scheduler configured to perform data block merge/sort and aligned scheduling for the 10 requests. The IO scheduler can reside between the application (application module, block data module, and file system) and the module 120, in one illustrative embodiment.

Figure 2:
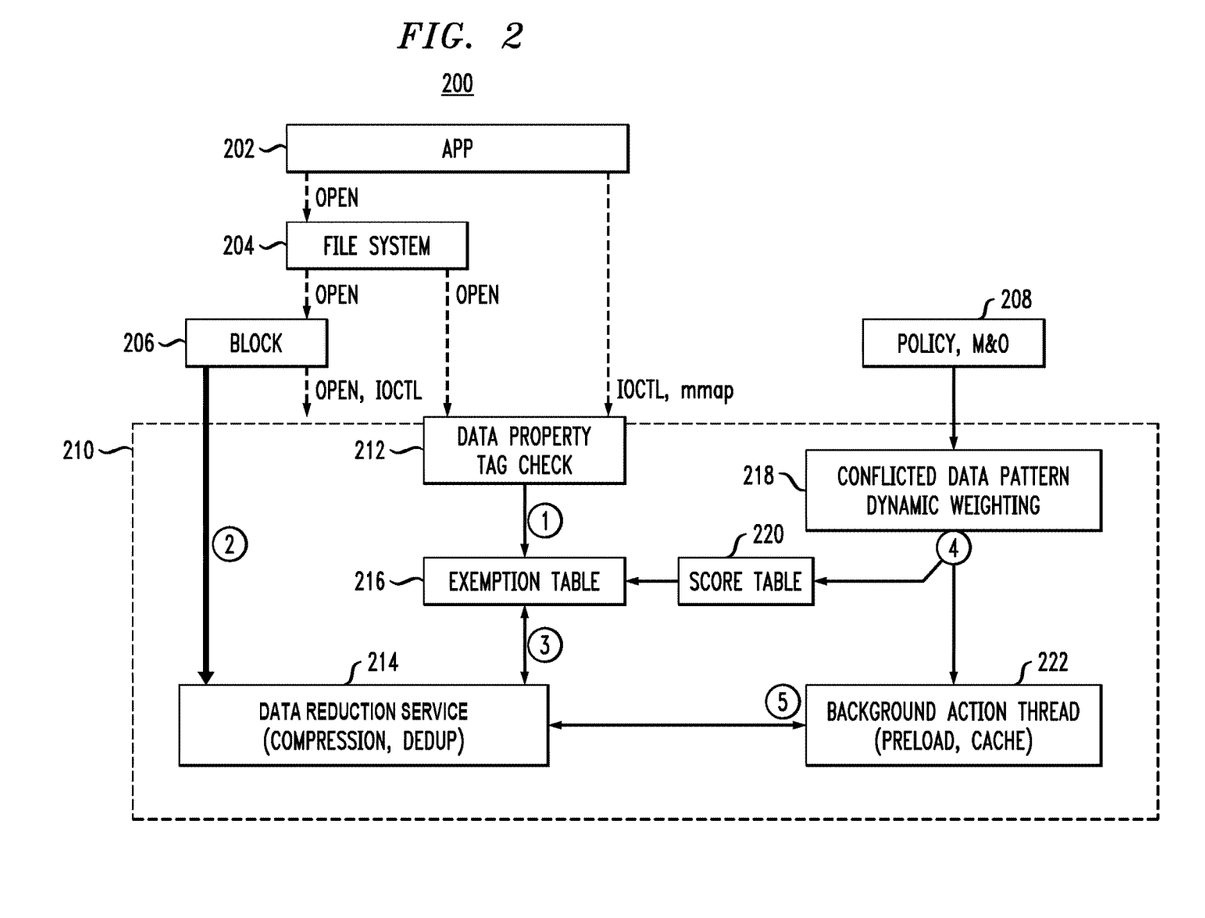
FIG. 2 illustrates a modular architecture for an application-aware and fine-grained control of data reduction type data service, according to an embodiment of the invention.

FIG. 2 illustrates a modular architecture for an application-aware and fine-grained control of data reduction type data service, according to an embodiment of the invention. More specifically, FIG. 2 illustrates further details in the context of computing environment 200 which is the same or similar to computing environment 100 of FIG. 1. Thus, as shown, application module 202, file system module 204, block data module 206, and policy (management & orchestration) module 208 are operatively coupled to data property tag module 210 which comprises data property tag check 212, data reduction service 214, exemption table 216, conflicted data pattern dynamic weighting 218, score table 220, and background action thread 222. Note that blocks/modules with the same or similar names in FIG. 2 as those shown in FIG. 1 have the same or similar functions. The steps below provide illustrative steps explaining operation of computing environment 200:

Step (1): Data property information can be specified via several interfaces (e.g., 212), either on the entire device/file or for a specific range. Such settings are stored in exemption table 216 as metadata (lightweight).

Step (2): Read/Write IO can come from either block data module 206, file system module 204, or application module 202. IOCTL (input/output control) can be used to provide system calls for device-specific input/output operations.

Step (3): Data reduction services 214 query exemption table 216 and make a decision whether to bypass deduplication, compression, or both.

Steps (4~5): Receipt of an IO acknowledgement, in background, notifies conflicted pattern dynamic weighting module 218 to update the relevant statistics, and to identify and score any hot (frequent) and conflicted ranges (such as partial reads/writes) and update score table 220. Per a given policy, conflicted ranges can be added to exemption table 216, or actions such as proactively loading data, de-compressing as read cache, etc., can be performed and/or initiated by module 222.

With data property tag (DPT) functionalities, a static hint interface is provided between the application and the data reduction services. The interface can be implemented as open flags, memory-mapped (mmap) flags or static address space masking. Thus, the application can set pre-defined tags on specific targets and provide hints to the underlying data reduction services to bypass operations for higher performance. It is to be appreciated that the final decision (bypass data reduction services or not) is made by the deduplication/compression services depending on their evaluation on impact to their operations.

DPT functionalities cover static data properties that may impact data reduction services. Dynamic running properties are also captured, particularly emphasizing partial read or write patterns which are called "conflicted" patterns due to their negative impact on data reduction services.

As will be further explained below, illustrative embodiments partition datasets into coarse-grained chunks and track conflicted activities per chunk, score them with configured weights, then dynamically adjust features or take background actions based on quality-of-service (QoS) linked policies such as, for example, bypass the deduplication/compression for top 5% hot datasets, or preload the data, etc. Such weighting and adjusting functionalities are running in separate threads and in a dynamic manner (with relevant policies and refresh windows). Illustrative embodiments guarantee the data integrity, consistency, and correctness of the application and its datasets.

As explained above, one application-aware parameter is the data property tag. This is a mechanism to describe relevant data properties. With DPT, the application can specify pre-defined flags or combinations of flags via several possible interfaces, and thus provide hints to the underlying data reduction services, such as deduplication and/or compression. These data reduction services are now made application-aware by checking the DPT flags and taking actions based on these parameters (e.g., bypass deduplication, compression, or both (since different flags may have various impacts to different data reduction services)). In illustrative embodiments, pre-defined DPT flags/information includes, but are not limited to:

1) O_METADATA: this indicates that the subject data is application metadata such as inode, mapping table, checksum etc. Note here that the application means the consumer of the deduplication/compression (which may also be the file system or database (block data module), etc.

2) O_JOURNAL: this indicates that the subject data is an application journaling log, either a redo log and/or an undo log. As is known, a journaling log keeps track of changes not yet committed to a file system's main part by recording the intentions of such changes in a data structure (called a journal or journaling log).

3) O_COMPRESSED: this indicates that the subject data is already compressed in some manner (such as by the application or that the file is naturally compressed such as with a photo, video, etc) and there is no need to compress the data again or further.

4) O_ENCRYPTED: this indicates that the subject data is encrypted and thus likely can not be deduplicated.

5) O_REPLICA: this indicates that the subject data is duplicated intentionally for redundancy and thus should not be deduplicated.

6) O_RANDOM: this indicates that the subject data contains some random data and thus is not friendly to (adversely impacts) deduplication/compression.

7) O_UNIQUE_KEY: this indicates that the subject data has a unique key embedded such as a UUID (universally unique identifier) and thus is not friendly to (adversely impacts) deduplication/compression.

8) DPT may extend to more flags such as O_HOTRANGE which will be further described below in the context of DPDW functionalities.

With the above flags, illustrative embodiments propose three mechanisms or interfaces to use:

1) DPT flag during open file or device: When the application or file system first opens the file or block device, it could specify relevant flag(s) as tags to best describe the data property. Such open flags can be defined at POSIX system calls and libraries such as libc.

2) DPT flag and address range by IOCTL or fadvise function: As noted, the above flags take effect on the entire dataset of the target file or device, which may not always be flexible enough. Therefore, another fine-granularity mechanism is used to assign DPT by POSIX IOCTL on specific ranges of devices or POSIX fadvise( ) for files, so underlying data reduction services track this information as part of metadata, e.g.:

int ioctl(int fd, int SET_DPT_CMD, range_pair_list[ ], int range_cnt)

where range_pair_list is K-V like list and each item is {[startOffset, Len], flags}.

posix_fadvise(int fd, off_t offset, off_t len, int advice|DPT_FLAG)

3) DPT flag in mmap( )/madvise( ) interface: Files or fast devices such as flash memory can be directly mapped into application memory space through a mmap interface. As such, an extra flag can be added in mmap or madvice, such as, e.g.:

int mmap(*addr, length, prot, int DPT_FLAGs, fd, off_t offset)

madvise(void*addr, size_t length, int advice|DPT_FLAG)

Figure 3:
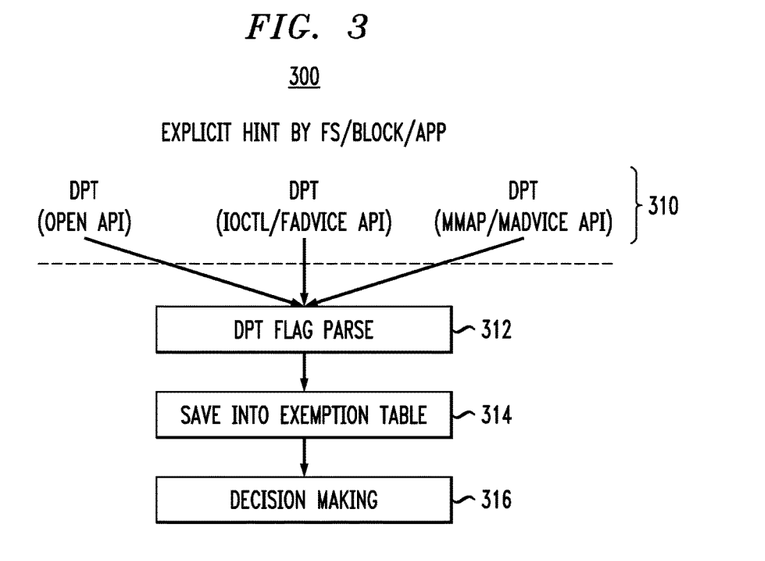
FIG. 3 illustrates a data property tag interface and parse-store methodology, according to an embodiment of the invention.
Figure 4:
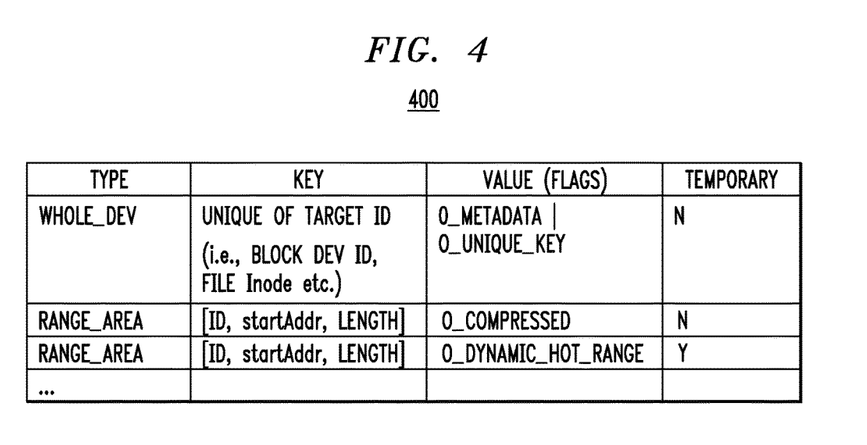
FIG. 4 illustrates an exemption table format example, according to an embodiment of the invention.

As illustrated in methodology 300 of FIG. 3, such DPT information (collectively shown as 310) is parsed (312) by the framework and saved (314) into an exemption table (as shown in FIG. 2) as metadata for deduplication/compression decision making (316). Table 400 in FIG. 4 shows one example of an exemption table format.

Note, in addition to the application-explicit hints provided by the DPT functionalities, illustrative embodiments automatically identify some hot (or "conflicted") ranges via DPDW module (218 in FIG. 2). For these dynamically captured items, they are marked as "temporary" since they may change over time.

In theory, cold data (data not frequently accessed) is the ideal workload for data reduction. Write-once and rarely access type data is typically considered cold data. However, it is difficult to fully control workload access patterns (which is determined by the application). It is realized herein that some patterns would heavily conflict with deduplication/compression in terms of performance penalties. Frequency is one of the factors but not in all cases. Consider a partial IO on compressed data, for example, due to IO amplification and read-modify-recompress.

Accordingly, illustrative embodiments continuously monitor data access patterns especially those conflicted patterns and evaluate (on-the-fly, i.e., in real time) their impact to data reduction services. Factors that can cause conflict include, but are not limited to:

Partial or full IO
Frequency
Read or (re-)write
Deduplication/compression actual effectiveness. For example, it may be learned that a particular range always fails to deduplicate, or is difficult to compress. This factor can reflect static properties such as random\unique\compressed with respect to datasets.

Naturally, different factors have different impacts to different data reduction services. Hence, DPDW functionalities provide weight configuration for evaluation, and maintain efficient metadata for dynamic scoring and sorting. In one embodiment, an array with weighted counters is maintained to track conflicted access patterns.

Figure 5:
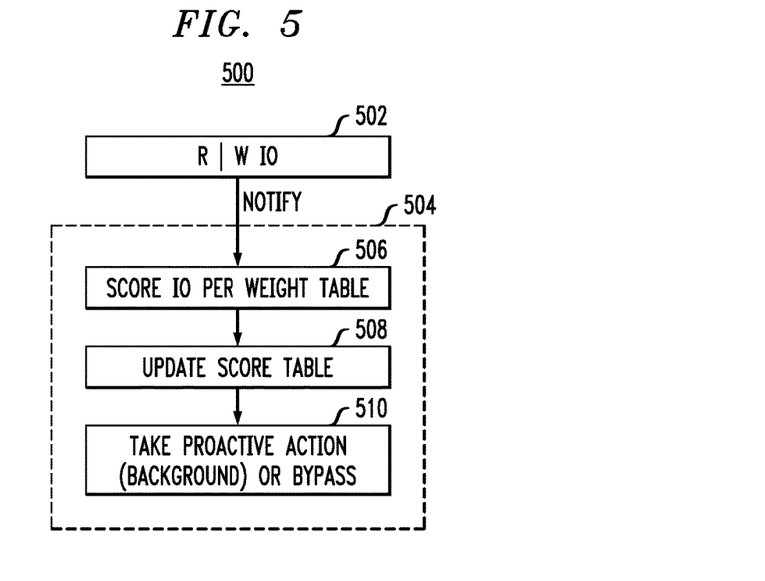
FIG. 5 illustrates a conflicted data access pattern dynamic weighting methodology, according to an embodiment of the invention.

FIG. 5 illustrates a conflicted data access pattern dynamic weighting methodology 500. As shown, in step 502, a read or write (R/W) IO request is provided to DPDW module 504. In step 506, the IO request is scored per a given weight table. The score table is updated in step 508 to reflect the IO request. Then, in step 510, a proactive action can be taken (in the background) or the data reduction service can be bypassed for the given IO request. Further details of these steps will be explained below.

Note that dynamic weighting and relevant actions are running in separate processing threads and out of the critical application IO path. Thus, DPDW has minimum impact to normal performance. Further, any action would take effect on the next dataset received.

Main design aspects will now be explained.

1) Chunk granularity. An access pattern is tracked on a coarse granularity basis to reduce memory footprint. In one example, the methodology could break the target logical address space (not physical) into fixed-sized chunks. Chunk size could be a multiple of the deduplication/compression segment size. For example, deduplication/compression segment size could be 4 KB~64 KB (KiloBytes); then chunk size could be 64 KB~1 MB (128 KB by default, for example).

Figure 6:
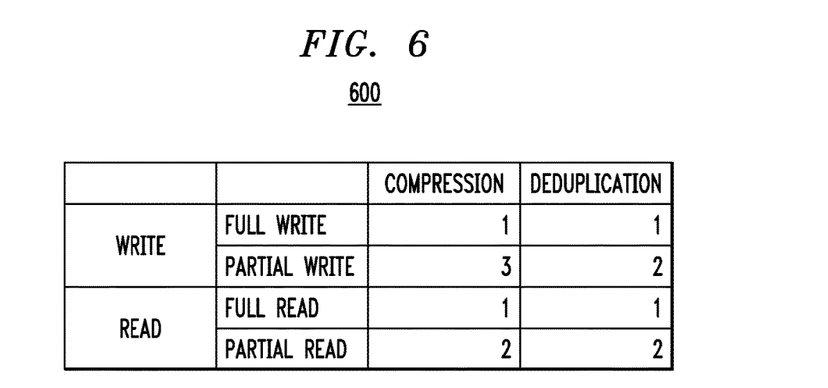
FIG. 6 illustrates an example of configurable weights for various conflicted input/output patterns, according to an embodiment of the invention.

2) Weighting. An access pattern is scored based on its negative impact to various features of the data reduction service, which is denoted by a configurable weight. Higher weights correspond to larger negative impact and thus need more attention in order to optimize. FIG. 6 illustrates an example of a weight table 600. Note how a partial IO request is set at a higher weight than a full IO request due to its extra IO penalty. Note that the factor "deduplication/compression actual effectiveness" is not shown in table 600, but it can be implemented and scored.

Figure 7:
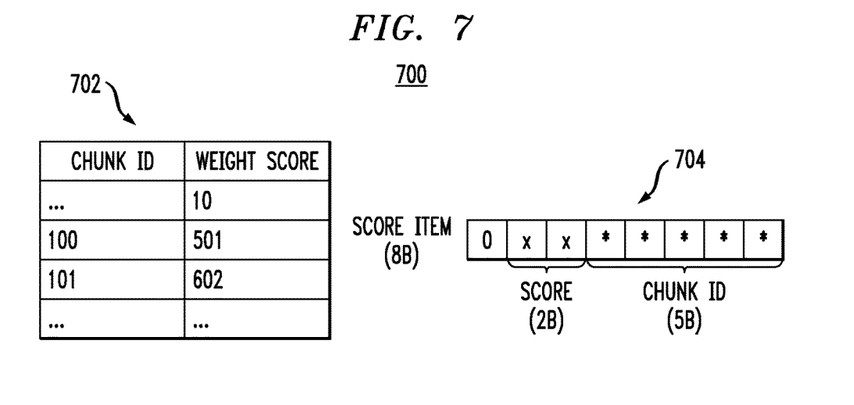
FIG. 7 illustrates a score table and score item format example, according to an embodiment of the invention.

3) Synthetic score. Given a timing window, the DPDW methodology aggregates the access scores (so sum of [accessEvent*weight]) and keeps a final score per chunk. For each enabled device, a score table maintains such weight as well as ChunkID. A score table 702 is shown in example 700 of FIG. 7 with a score item 704. So if the chunk size is 128 KB, 8B is used for each score item, 5B is for chunkID (so represents 128 KB), 2B is for weighted score (up to 65536), and another 1B is reserved for future usage, then such a score table actually consumes 56 MB memory for 1 TB of raw data.

4) Sorting and action. The DPDW methodology then sorts the score table and filters out TopN conflicted chunks, and takes necessary actions. Sorting is performed in the background controlled by a configurable policy with attributes such as, but not limited to:

Trigger timing: this may be a periodical timer, or can be linked with QoS such as IOPS or latency dropping to a specific level, or can be force sorted.

Filter top quantity: such as special action could only take effect on top 1% or 5% conflicted chunks. Such percentage could be configured in a static rule table or bound with QoS, such as a performance drop of 30% may trigger 1%; 50% drop maps to 5%, etc. To avoid a data scan, the score table could be put into an ordered list with high score items at the head (wherein score table updates are performed in the background). In another implementation, the DPDW methodology maintains a global matrix such as a maximum score or an average score to facilitate sort and filter operations.

Action: for the top conflicted chunk(s), the DPDW methodology may take special action(s) such as, but not limited to:

1) Added into the exemption table with a pre-defined flag and marked as temporary. Thus, new writes may skip deduplication or compression.

2) Notify background worker thread to preload data and provide read cache (for example, with LRU) to accelerate frequent read performance.

Similarly, as described above, such actions could be configured as static rule-based or linked with QoS.

5) Refresh score table. With a configurable refresh period (such as, for example, 3 minutes), the DPDW methodology may reset all the scores in the score table and launch a new round of weighting, which means only recently conflicted IO patterns and activities are evaluated. Another implementation is keeping older scores but setting an accepted percentage (such as, for example, 30%) for final synthetic scores.

Figure 8:
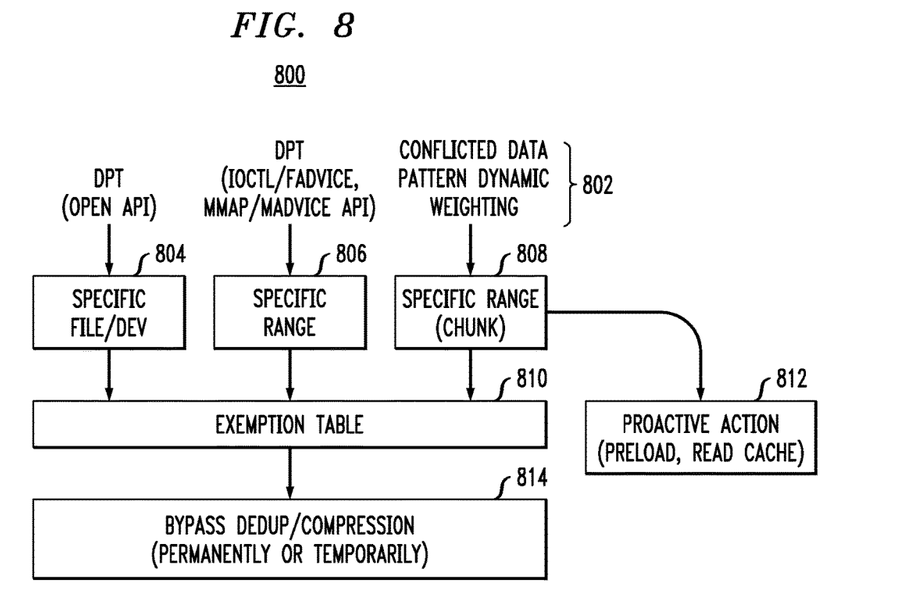
FIG. 8 further illustrates an application-aware and fine-grained control of data reduction type data service, according to an embodiment of the invention.

Given either explicit DPT hints by the application or dynamic conflicted pattern tracking, data reduction services make a decision that is transparent to the application. Example 800 in FIG. 8 summarizes the different input cases and actions. DPT and DPDW functionalities are collectively denoted as 802. DPT applies to specific files/devices (804) and specific ranges (806). DPDW applies to specific ranges of chunks (808). Each of blocks 804, 806 and 808 are operatively coupled to exemption table 810, which itself is operatively coupled to data reduction service bypass step 814. DPDW functionalities are also operatively coupled to proactive actions step 812. As explained above, bypass for conflicted areas identified by the DPDW methodology can be temporary, as a workload may change over time.

Figure 9:
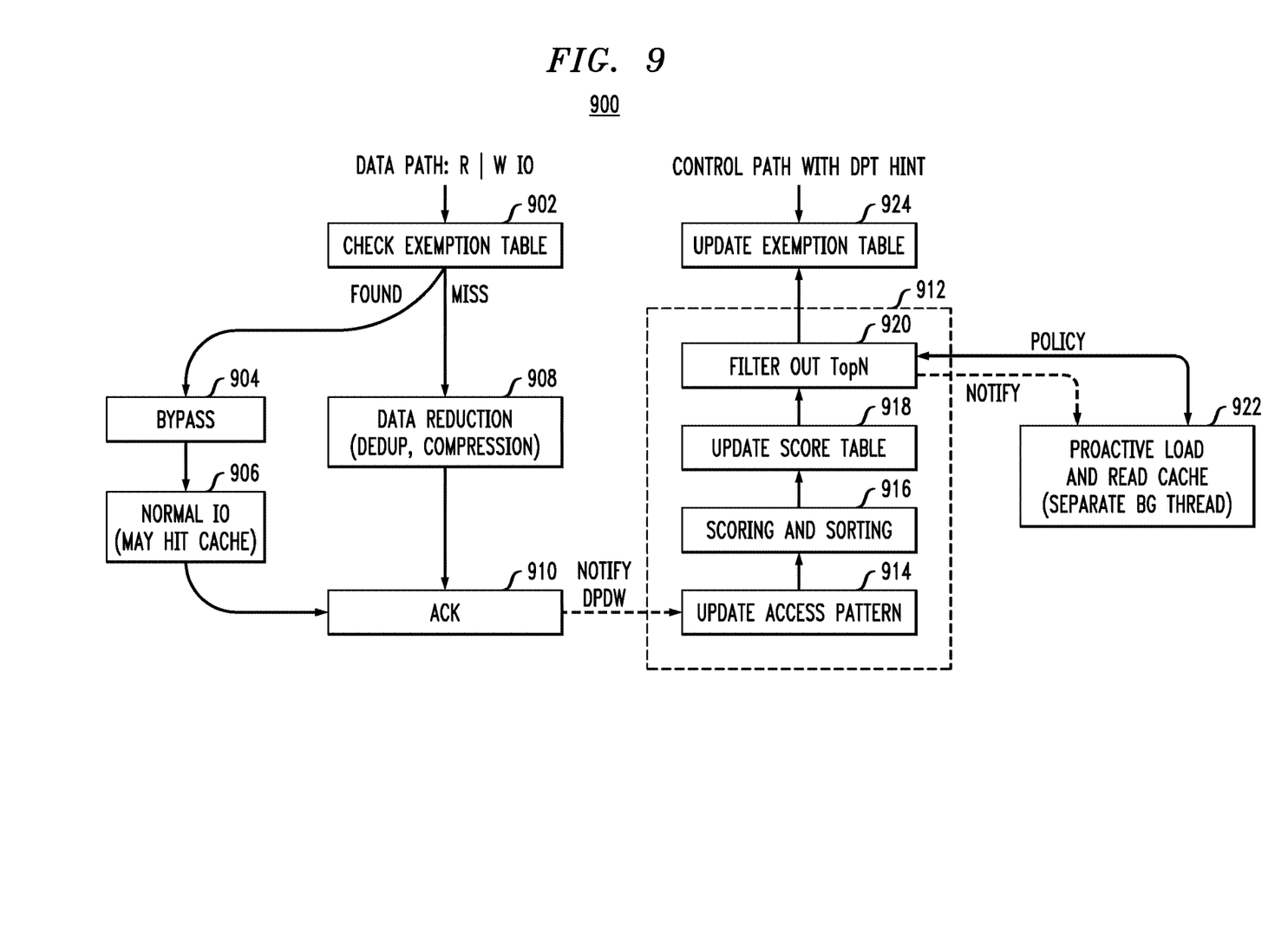
FIG. 9 illustrates data and control path handling for an application-aware and fine-grained control of data reduction type data service, according to an embodiment of the invention.

FIG. 9 shows an example 900 of overall control path and IO routine operations, as illustratively explained above. As shown, a data path for a R/W IO request is illustrated on the left side of the flow diagram, while a control path is illustrated on the right side of the flow diagram. On the data path side, step 902 checks the exemption table for the given IO request. If the IO request is found by its key in the exemption table, it is bypassed (no data reduction services applied to its dataset) in step 904, and the IO request is treated as a normal IO request in step 906. Note that if the IO request is not found in the exemption table, then data reduction services are applied to its dataset in step 908. An acknowledgement is sent in step 910 to notify the DPDW methodology 912.

On the control path side, the DPDW methodology 912 then updates access patterns in step 914, performs scoring and sorting in step 916, updates the score table in step 918, filters out the TopN conflicted chunks in step 920, takes a proactive background action in step 922, and updates the exemption table in step 924.

Activities such as weighting, sorting, as well as preloading (such as read hot data, decompress and load as read cache), are all running in separate threads so as to cause the least amount of contention and the least impact to normal IO operations. Equally important, while the methodology may consume disk space, it does not impact data integrity, consistency, or correctness.

As explained herein, illustrative embodiments provide application-aware and fine-grained control of data reduction services with static data property tag (DPT) and dynamic conflicted data pattern weighting (DPDW) functionalities. DPT is handled in a explicit manner by the application, while DPDW is handled in an automatic manner with the least manual operation or application change as possible. Thus, both DPT and DPDW functionalities may be considered "application-aware." DPT is implemented with various interfaces either on the entire target or a specific range. DPDW is based on a pattern's negative impact to data reduction. Chunk-level sorting and filtering, efficient metadata, and out-of-bind updates are supported. Proactive actions and link with rule-based policy or QoS setting is also provided.

As an add-on plugin, such a framework can be integrated with any existing deduplication or compression service (such as, but not limited to, EMC Corporation's CloudArray or CloudBoost). Advantageously, the framework does not change the deduplication/compression core logic and is transparent to the application.

Figure 10:
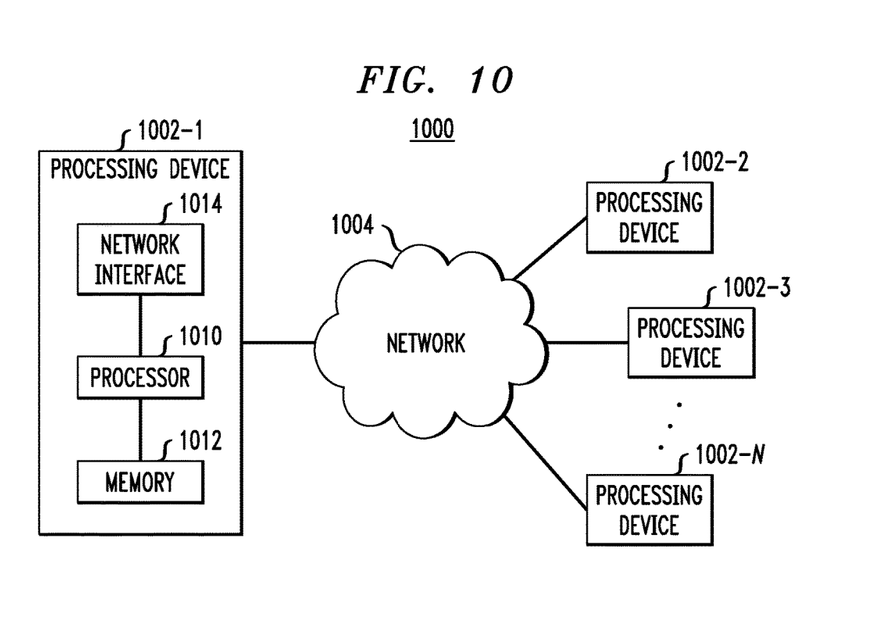
FIG. 10 illustrates a processing platform used to implement a computing environment with an application-aware and fine-grained control of data reduction type data service, according to an embodiment of the invention.

FIG. 10 illustrates a processing platform used to implement a computing environment with an application-aware and fine-grained control of data reduction type data services, according to an embodiment of the invention.

As an example of a processing platform on which a computing environment such as a cloud computing platform with application-aware and fine-grained control of data reduction type data service functionalities (e.g., FIGS. 1-9) can be implemented is processing platform 1000 shown in FIG. 10. It is to be appreciated that processing platform 1000 may implement the functionalities described herein. For example, the various architectures and methodologies of FIGS. 1-9 can be implemented in processing platform 1000.

The processing platform 1000 in this embodiment comprises a plurality of processing devices, denoted 1002-1, 1002-2, 1002-3, . . . 1002-N, which communicate with one another over a network 1004. It is to be appreciated that the methodologies described herein may be executed in one such processing device 1002, or executed in a distributed manner across two or more such processing devices 1002. It is to be further appreciated that a server, a client device, a computing device or any other processing platform element may be viewed as an example of what is more generally referred to herein as a "processing device." As illustrated in FIG. 10, such a device generally comprises at least one processor and an associated memory, and implements one or more functional modules for instantiating and/or controlling features of systems and methodologies described herein. Multiple elements or modules may be implemented by a single processing device in a given embodiment.

The processing device 1002-1 in the processing platform 1000 comprises a processor 1010 coupled to a memory 1012. The processor 1010 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1010. Memory 1012 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1012 may comprise electronic memory such as random access memory (RAM), read-only memory (ROM) or other types of memory, in any combination. The one or more software programs when executed by a processing device such as the processing device 1002-1 causes the device to perform functions associated with one or more of the components/steps of system/methodologies in FIGS. 1-9. One skilled in the art would be readily able to implement such software given the teachings provided herein. Other examples of processor-readable storage media embodying embodiments of the invention may include, for example, optical or magnetic disks.

Processing device 1002-1 also includes network interface circuitry 1014, which is used to interface the device with the network 1004 and other system components. Such circuitry may comprise conventional transceivers of a type well known in the art.

The other processing devices 1002 (1002-2, 1002-3, . . . 1002-N) of the processing platform 1000 are assumed to be configured in a manner similar to that shown for computing device 1002-1 in the figure.

The processing platform 1000 shown in FIG. 10 may comprise additional known components such as batch processing systems, parallel processing systems, physical machines, virtual machines, virtual switches, storage volumes, etc. Again, the particular processing platform shown in this figure is presented by way of example only, and the system shown as 1000 in FIG. 10 may include additional or alternative processing platforms, as well as numerous distinct processing platforms in any combination.

Also, numerous other arrangements of servers, clients, computers, storage devices or other components are possible in processing platform 1000. Such components can communicate with other elements of the processing platform 1000 over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements (e.g., using virtual machines and/or containers). In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method of controlling operation of one or more data services that perform one or more data reduction operations in a computing environment, comprising:
    obtaining, from an application executing on a host device in the computing environment, a request to one of read data from and write data to one or more storage devices in the computing environment;
    obtaining one or more application-aware parameters associated with the data of the request, wherein the one or more application-aware parameters comprise data property information relating to the data of the request;
    controlling the operation of the one or more data services based on the one or more application-aware parameters;
    partitioning the data of the request into data chunks of a given granularity based on a data segment size for the one or more data reduction operations;
    tracking conflicted activities per data chunk to determine a plurality of conflicted data chunks; and
    scoring the plurality of conflicted data chunks;
    wherein controlling the operation of the one or more data services comprises maintaining an exemption data structure, and determining whether to exempt at least a portion of the data of the request from being processed by the one or more data services by querying the exemption data structure;
    wherein maintaining the exemption data structure comprises dynamically adding a subset of the plurality of conflicted data chunks having scores above a predetermined threshold to the exemption data structure;
    wherein, in response to determining that the portion of the data of the request is not exempt from being processed, applying the one or more data reduction operations to the portion of the data of the request;
    wherein the data property information of the one or more application-aware parameters comprises one or more data property tags pre-defined for the data of the request that provide one or more hints to a given data service to bypass a given data reduction operation; and
    wherein the computing environment is implemented via one or more processing devices operatively coupled via a communication network.

2. The method of claim 1, wherein the data property information comprises an indication of metadata attributable to the application.

3. The method of claim 1, wherein the data property information comprises an indication of a journaling log of the application.

4. The method of claim 1, wherein the data property information comprises an indication of whether or not the data of the request is already compressed.

5. The method of claim 1, wherein the data property information comprises an indication of whether or not the data of the request is encrypted.

6. The method of claim 1, wherein the data property information comprises an indication of whether or not the data of the request is intentionally duplicated.

7. The method of claim 1, wherein the data property information comprises an indication of whether or not the data of the request contains data that adversely impacts operation of the one or more data services.

8. The method of claim 1, wherein the data property information comprises an indication of whether or not the data of the request is frequently accessed.

9. The method of claim 1, wherein the one or more application-aware parameters comprise data access pattern information relating to the data of the request.

10. The method of claim 9, wherein the data access pattern information comprises information relating to conflicted access patterns that adversely impact operation of the one or more data services.

11. The method of claim 10, wherein
    the scoring is performed using weights based on the tracked conflicted activities.

12. The method of claim 11, wherein the scoring step further comprises maintaining a scoring data structure that is dynamically updated in accordance with a given refresh time period.

13. The method of claim 11, wherein the scoring step further comprises maintaining a scoring data structure that is sorted based on a severity of adverse impact reflected by the scores of the plurality of conflicted data chunks.

14. The method of claim 1, wherein controlling operation of the one or more data services based on the one or more application-aware parameters further comprises taking at least one proactive action with respect to data access to improve the operation of the one or more data services.

15. The method of claim 14, wherein taking the at least one proactive action comprises notifying the application to preload data to accelerate frequent read performance.

16. The method of claim 1, further comprising parsing the one or more data property tags, and saving the parsed one or more data property tags into the exemption data structure as metadata for controlling the operation of the one or more data services.

17. The method of claim 1, wherein the one or more data reduction operations comprise one or more of data deduplication and data compression.

18. A system for controlling operation of one or more data services that perform one or more data reduction operations in a computing environment, the system comprising:
   at least one processor, coupled to a memory, and configured to:
   obtain, from an application executing on a host device in the computing environment, a request to one of read data from and write data to one or more storage devices in the computing environment;
   obtain one or more application-aware parameters associated with the data of the request, wherein the one or more application-aware parameters comprise data property information relating to the data of the request;
   control the operation of the one or more data services based on the one or more application-aware parameters;
   partition the data of the request into data chunks of a given granularity based on a data segment size for the one or more data reduction operations;
   track conflicted activities per data chunk to determine a plurality of conflicted data chunks; and
   score the plurality of conflicted data chunks;
   wherein, in controlling the operation of the one or more data services, the at least one processor is configured to maintain an exemption data structure, and determine whether to exempt at least a portion of the data of the request from being processed by the one or more data services by querying the exemption data structure;
   wherein in maintaining the exemption data structure, the at least one processor is configured to dynamically add a subset of the plurality of conflicted data chunks having scores above a predetermined threshold to the exemption data structure;
   wherein, in response to determining that the portion of the data of the request is not exempt from being processed, the at least one processor is configured to apply the one or more data reduction operations to the portion of the data of the request; and
   wherein the data property information of the one or more application-aware parameters comprises one or more data property tags pre-defined for the data of the request that provide one or more hints to a given data service to bypass a given data reduction operation.

19. The system of claim 18, wherein the one or more data reduction operations comprise one or more of data deduplication and data compression.

20. An article of manufacture for controlling operation of one or more data services that perform one or more data reduction operations in a computing environment, the article of manufacture comprising a processor-readable storage medium having encoded therein executable code of one or more software programs, wherein the one or more software programs when executed by at least one processing device implement the steps of:
   obtaining, from an application executing on a host device in the computing environment, a request to one of read data from and write data to one or more storage devices in the computing environment;
   obtaining one or more application-aware parameters associated with the data of the request, wherein the one or more application-aware parameters comprise data property information relating to the data of the request;
   controlling the operation of the one or more data services based on the one or more application-aware parameters;
   partitioning the data of the request into data chunks of a given granularity based on a data segment size for the one or more data reduction operations;
   tracking conflicted activities per data chunk to determine a plurality of conflicted data chunks; and
   scoring the plurality of conflicted data chunks;
   wherein controlling the operation of the one or more data services comprises maintaining an exemption data structure, and determining whether to exempt at least a portion of the data of the request from being processed by the one or more data services by querying the exemption data structure;
   wherein maintaining the exemption data structure comprises dynamically adding a subset of the plurality of conflicted data chunks having scores above a predetermined threshold to the exemption data structure;
   wherein, in response to determining that the portion of the data of the request is not exempt from being processed, applying the one or more data reduction operations to at least the portion of the data of the request; and
   wherein the data property information of the one or more application-aware parameters comprises one or more data property tags pre-defined for the data of the request that provide one or more hints to a given data service to bypass a given data reduction operation.

* * * * *